United States Patent [19]
Nyseth

[11] Patent Number: 5,078,004
[45] Date of Patent: Jan. 7, 1992

[54] FLOW METER

[75] Inventor: David L. Nyseth, Plymouth, Minn.

[73] Assignee: Futurestar Corporation, Edina, Minn.

[21] Appl. No.: 679,728

[22] Filed: Apr. 3, 1991

Related U.S. Application Data

[63] Continuation of Ser. No. 389,621, Aug. 3, 1989, abandoned, which is a continuation of Ser. No. 156,716, Feb. 17, 1988, abandoned, which is a continuation of Ser. No. 893,000, Aug. 1, 1986, abandoned.

[51] Int. Cl.$^5$ .............................................. G01F 1/22
[52] U.S. Cl. .................................................. 73/861.55
[58] Field of Search ........... 73/861.53, 861.55, 861.56, 73/861.57; 251/205, 215

[56] References Cited

U.S. PATENT DOCUMENTS

| | | | |
|---|---|---|---|
| 2,350,343 | 6/1944 | Fischer | 73/861.57 |
| 2,458,637 | 1/1949 | Pratt et al. | 73/861.57 |
| 2,707,879 | 5/1955 | Dwyer | 73/861.55 |
| 2,778,223 | 1/1957 | Kimbrell | 73/861.55 |
| 3,232,106 | 1/1966 | Busillo | 73/861.55 |
| 3,342,068 | 9/1967 | Metzger | 73/861.55 |
| 3,416,370 | 12/1968 | Kaucher et al. | 73/861.55 |
| 3,490,284 | 1/1970 | Engelhardt | 73/861.55 |
| 3,712,132 | 1/1973 | Dettmer | 73/861.55 |
| 3,956,933 | 5/1976 | Metzger | 73/861.55 |

Primary Examiner—Herbert Goldstein
Attorney, Agent, or Firm—Lawrence M. Nawrocki

[57] ABSTRACT

The apparatus (10) includes a metering tube (18) and a sight tube (22) intersecting the metering tube (18). Fluid communication between a bore (68) formed axially in the sight tube (22) and a passage (38) in the metering tube (18) is provided through an orifice (64). Flow through the meter (10) is regulated by a valve member (40) which moves in passage (38) and across the orifice (64). The bore (68) in the sight tube (22) is tapered upwardly and outwardly, and a flow sensitive element (72) rises and lowers within the bore, depending upon the flow induced. As the element (72) rises, an annular space (86) defined between the inner wall of the bore (68) and the determinant diameter (74) of the flow sensitive element (72) increases to define an annulus having a greater area than when the flow sensitive element (72) is in a lower position.

13 Claims, 2 Drawing Sheets

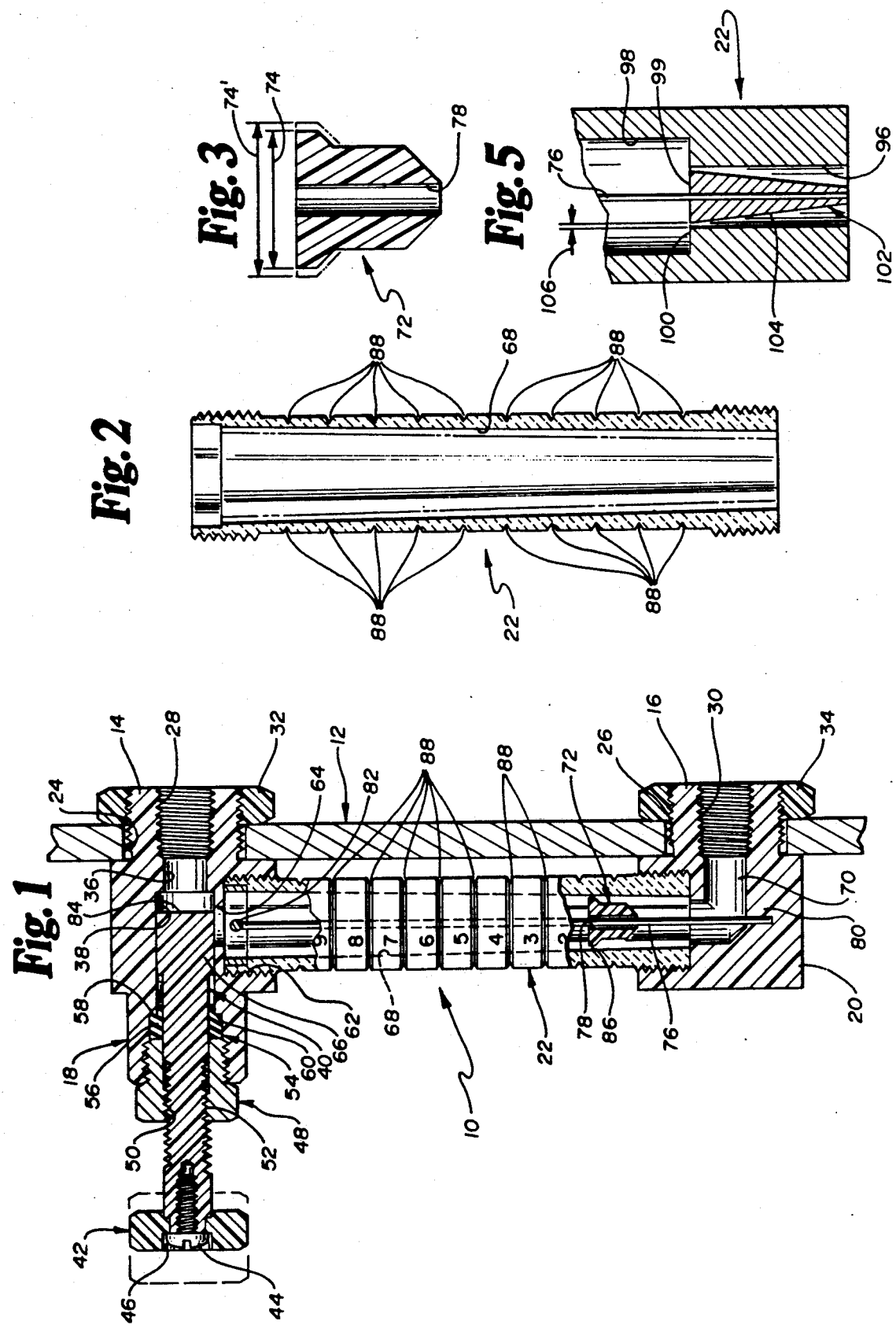

FLOW METER

This is a continuation of copending application Ser. No. 07/389,621 filed on Aug. 3, 1989, now abandoned which is a continuation of application Ser. No. 07/156,716 filed on Feb. 17, 1988, now abandoned, which is a continuation of application Ser. No. 06/893,000 filed on Aug. 1, 1986, now abandoned.

TECHNICAL FIELD

The present invention is broadly related to the field of fluid flow and apparatus for controlling and regulating such flow. More narrowly, however, the invention deals, in a specific embodiment, with the technology of controlling and regulating flow of corrosive liquids such as various acids and solvents, and deionized water. A preferred embodiment in accordance with the invention employs structure for accurately ascertaining what the flow is through the device so that flow can be metered to comply with desired parameters.

BACKGROUND OF THE INVENTION

The regulation of fluid flow is an essential step performed in industry. For example, different caustic and corrosive acids are utilized in the manufacture of various integrated circuit devices. It can be particularly important to know quantities of the different acids transferred, and consequently, measuring flow rate accurately can be critical.

Additionally, because of the nature of the chemicals that are employed in the etching of integrated circuit traces, apparatus for the storage and transfer of such chemicals must be impervious to corrosion and deterioration which might occur when the chemicals come in contact with various components of such systems. The safety hazards inherent in a system not impervious to deterioration will be apparent.

This invention is particularly sensitive to these dictates of the prior art. It is to the desireable features mandated by the prior art that the present invention is directed.

This invention is a flow meter which is particularly accurate in its measurements. Additionally, because of the manner of its construction, it is insensitive to caustic chemicals with which it can be used.

SUMMARY OF THE INVENTION

The present invention is a flow meter which includes a metering tube having a passage formed axially through the body thereof. One end of the passage can function as a discharge aperture of the meter, fluid having passed through the meter exiting through this aperture. The metering tube is provided with an orifice intersecting the passage intermediate its axial ends. The invention further comprises a sight tube which has a bore formed axially therethrough. The bore is in fluid communication, through the orifice, when the orifice is unobstructed, with the passage in the metering tube. The bore in the sight tube houses a flow sensitive element which is disposed for axial movement therealong. The flow sensitive element is biased toward a position away from the intersection of the sight tube with the metering tube. The size and spatial relationship of the element is such, relative to the bore, so that, as the element approaches an end of the bore proximate the orifice, an increasingly greater volume of fluid is permitted to pass through an annular space between the flow sensitive element and the wall defining the bore. A valve member is disposed in the passage for selective positioning axially therealong and across the orifice. Fluid flow through the meter is, thereby, regulated by adjusting the positioning of the valve member. As the valve member is adjusted to enlarge or diminish the size of portion of the orifice through which flow will be permitted, the location of the flow sensitive element along the bore will vary. As the valve member is positioned to permit increased fluid flow through the orifice, the flow sensitive element will be urged by the fluid flow toward an end of the bore proximate the orifice. Further, means are provided for ascertaining the level of volumetric flow of fluid through the flow meter depending upon the axial location of the flow sensitive element at which it stabilizes after flow has been adjusted.

In the preferred embodiment, the orifice is circular in shape. A leading edge of the valve member is generally linear and defines a chord with respect to the circular orifice as that leading edge moves across the orifice. It is envisioned that the leading edge would be generally perpendicular to the axis with respect to which the valve member is moved.

As can be seen then, as the orifice is initally uncovered to permit fluid flow, only a very small area will be exposed. As the valve member is retracted increased linear distances of the same dimension, however, the volume of flow increase will be greater than in previous retractions of the same distance. Consequently more discrimination can be made in regulating the metering.

The sight tube can be provided with a flared bore, the larger diameter of the bore being more closely proximate the intersection of the sight tube with the metering tube. As can be seen then in view of this discussion, when the flow determinant diametrical dimension of the flow sensitive element is maintained constant, as flow is increased through the meter in response to a retraction of the valve member to expose a greater portion of the orifice, the flow sensitive element will be urged in the direction toward the orifice, and a larger annulus area around the flow sensitive element in the sight tube will permit a greater volumetric flow of fluid through the tube. The attainment of an axial position by the flow sensitive element at a location more closely proximate the orifice will, therefore, be representative of a greater flow rate than will one at a distance farther from the orifice.

The sight tube can be provided with a series of graduated indicia therealong. Flow can be ascertained by noting the position of the flow sensitive element with respect to the various indicia when flow is adjusted by axially moving the valve member within the metering tube. The meter can be calibrated so that, for any particular sight tube and flow sensitive element combination, the position of the element at a particular indicium is known to represent a particular volumetric flow value.

As one will note in view of this disclosure, the flow sensitive element, necessarily, is not maintained closely proximate the wall defining the bore. As a result, it might be free to divert from a coaxial relationship relative to the bore, unless steps were taken to maintain it in such a relationship. Inaccurate measuring might, therefore, result.

The invention, however, contemplates the employment of a rod, coaxial with the bore, which passes through an aperture central within the flow sensitive element. In this manner, the element can be maintained in a coaxial relationship to the bore.

The various components can be formed from materials to make the meter impervious to deterioration by caustic acids. For example, the metering tube and one embodiment of the flow sensitive element can be formed from TEFLON ®. Other embodiments of the invention can employ flow sensitive elements made either completely of stainless steel or some combination of stainless steel and TEFLON ®. The sight tube can be made of PFA TEFLON ®.

The present invention is thus an improved flow meter for use with fluids, and particularly liquids which readily interact chemically with materials from which flow meters are typically made. Because of the structure of the meter, it provides highly accurate readings of fluid flow therethrough. More specific features and advantages obtained in view of those features will become apparent with reference to the DETAILED DESCRIPTION OF THE INVENTION, appended claims and accompanying drawing figures.

BRIEF DESCRIPTION OF THE DRAWINGS

FIG. 1 is a partial sectional view of a flow meter in accordance with present invention as mounted to a mounting plate;

FIG. 2 is a side-sectional view of the sight tube of the flow meter of FIG. 1;

FIG. 3 is an enlarged side sectional view of the flow sensitive element of the flow meter FIG. 1;

FIG. 5 is an enlarged side sectional view illustrating an alternative sight tube construction.

DETAILED DESCRIPTION OF THE INVENTION

Figure 4:
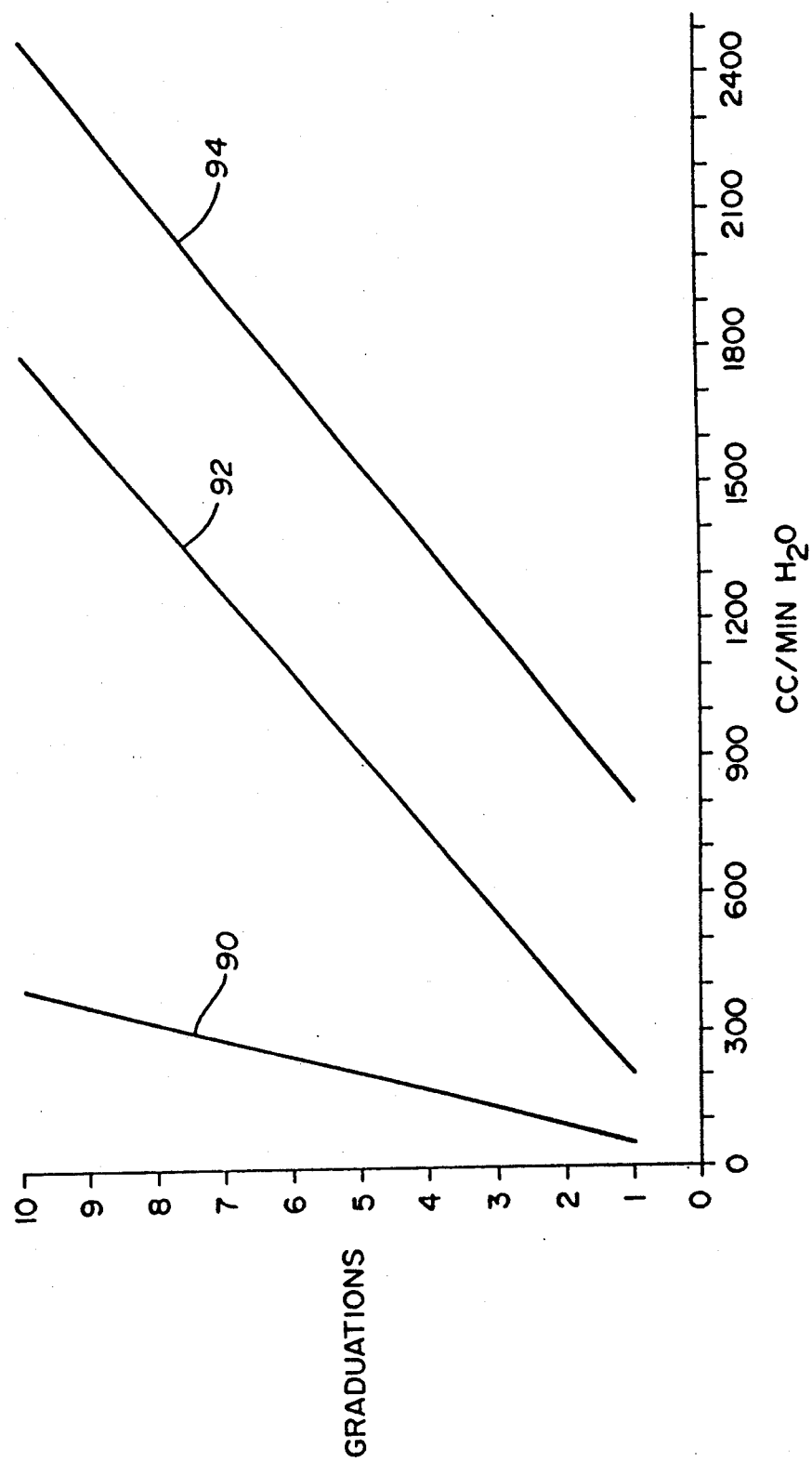
FIG. 4 is a graph illustrating a number of curves plotting flow rates as representative of the various graduation readings, the various curves corresponding to different sight tube/flow sensitive element configurations.

Referring now to the drawings wherein like reference numerals denote like elements throughout the several views, FIG. 1 illustrates a flow meter 10 in accordance the present invention as mounted to a plate or wall 12. The meter 10 includes upper and lower mounting fixtures, the upper fixture extending from a metering tube 18 as will be discussed hereinafter. The lower fixture 16 comprises a portion of an elbow 20 to which a sight tube 22 is mounted.

Each fixture has a threaded boss 14, 16 which extends through a corresponding aperture 24, 26 in the plate 12 to effect mounting thereto. FIG. 1 shows internally threaded apertures 28, 30 in the bosses 14, 16 for receiving corresponding, externally threaded, inlet and outlet tubing fittings (not shown). Lock nuts 32, 34 are provided on the bosses 14, 16. The tubing fittings can be threaded into the bosses 14, 16 and the nuts 32, 34 tightened down. As tightening progressively increases, commensurately increased pressure will be exerted on the tubing ends to securely hold them within the fitting bosses 14, 16.

The operative portions of the meter 10 include a metering tube 18 which, as previously indicated, is, in the preferred embodiment, integrally formed with the upper fitting by which the meter 10 is secured to the mounting plate 12. The metering tube 18, has formed therein, a passage which extends generally coaxially with respect to an axis of longation of the tube 18. The passage includes first, narrowed, and second, radially expanded portions 36, 38, respectively.

A valve member 40 is received within the expanded passage portion 38 for selective movement along the axis of the passage portion 38. Movement is accomplished by rotating a knurled knob 42 secured to an end of the valve member 40 which extends from the metering tube 18 at an end remote from the mounting plate 12. Securing of the knurled knob 42 to the valve member 40 can be effected by employment of a screw 44, the head of which is received within a recess 46 within the knob 42 when the screw 44 is tightened down.

A plug 48 having an internally threaded channel 50 formed therein closes the end of the metering tube 18 remote from the plate 12. The channel 50 therein is sized similarly to, and is compatibly threaded with, an externally-threaded portion 52 of the valve member 40 which extends therethrough. The plug 48 is tightened down and is maintained in position to occlude the end of the metering tube 18 remote from the mounting plate 12. The axial movement of the valve member 40 along the passage 38 is effected by threading the member 40 into and out of the passage 38 relative to the plug 48.

A seal 54 is held in place by the plug 48 to prevent any leakage of the fluid being metered by the flow meter 10. The seal 54 includes a radially expanded portion 56 which defines a shoulder 58, the shoulder 58 abuttably engaging an axially facing shoulder 60 internally within the passage 38, when the plug 48 is threaded inwardly in the passage 38 to close the end thereof. The radially expanded portion 56 of the seal 54 has an axial dimension such that, when the plug 48 is completely tightened down, it will be tightly maintained in position with the shoulder 58 of the seal 54 engaging the shoulder 60 defined by the inner wall forming the passage 38.

As seen in FIG. 1, an end of the valve member 40 most closely proximate the mounting plate 12 has a diameter closely approximating that of the passage 38 at all locations which can be coextensive therewith. As a result, the valve member 40 substantially seals the passage 38 and precludes axial flow therethrough beyond the valve member 40.

The metering tube 18 has an internally threaded aperature 62 approaching toward the passage 38 from the side of the tube 18. The aperature 62, in turn, communicates fluidly with the passage 38 through an orifice 64 which intersects the passage 38 at a location that can be coextensive with an occluding portion 66 of the valve member 40. Because of this relationship, the valve member 40 can preclude fluid communication through the orifice 64 to the passage 38 when the valve member 40 is in a position completely eclipsing the orifice 64.

A sight tube 22 is threadly mated, by its upper end, with the aperture 62 that communicates with the passage 38 through the orifice 64. A lower end of the sight tube 22 is mated to the elbow 20 comprising the lower fitting.

The sight tube 22 has a bore 68, extending between the opposite ends of the tube 22, formed therein. The lower end of the bore 68 communicates with a 90 degree channel 70 in the elbow 20, and the upper end of the bore 68 communicates, through the orifice 64, with the passage 38 in the metering tube 18. A continuous channel is, thereby, formed from the inlet fitting to the outlet fitting, and fluid flow is permitted through that channel when the valve member 40 is retracted to a point so that a least a portion of the orifice 64 is not obstructed.

The bore 68 illustrated in FIG. 1 is tapered, and it is shown as having a diameter greater at its end by which the sight tube 22 is mated to the metering tube 18. A flow sensitive element 72 is disposed in the bore 68 for axial movement therealong. Typically, the flow meter 10 would be oriented wherein the axis of elongation of the metering tube 18 is oriented generally horizontally and wherein the axis of elongation the sight tube 22 is oriented generally vertically. It will be understood that, when the flow meter 10 is so oriented, the flow sensitive element 72 is biased downwardly. In the embodiment illustrated in the figures, the flow sensitive element 72 is biased downwardly by gravity.

It will be understood, however, that other orientations of the flow meter 10 are contemplated. Biasing would, most likely, still be employed to bias the flow sensitive element 72 in a direction away from the metering tube 18, but other methods of biasing would be employed when such orientations were practiced.

As seen in FIG. 1, the flow determinant diameter 74 of the flow sensitive element, or float 72, is smaller than the internal diameter of the bore 68, even though that diameter can be varied from one embodiment of the invention to another, as is illustrated by use of phantom lines as at 74' in FIG. 3. This is true even when the float 72 is at a position near the bottom of the bore 68 at a section thereof having the narrowest internal diameter. In order to maintain the float 72 coaxial with the bore 68, therefore, a rod 76 can be employed as a guide. The rod 76 would be aligned along the axis of the bore 68 and would pass through an aperture 78 centrally within the float 72.

The rod 76 can be mounted in a wall 80 of the channel within the elbow 20 comprising the lower mounting fixture. The rod 76 would be of a length such that the float 72 could be free to move substantially along the full length of the sight tube 22. The rod 76 can be provided, at its upper end, with a bead 82, larger than the aperture 78, to preclude the flow sensitive element 72 from coming off the rod 76.

When a flow meter 10 as illustrated in FIG. 1 is secured to a mounting plate 12 for use, the valve member 40 would typically be in a position completely occluding the orifice 64. The inlet and outlet tubes would be mated to their respective bosses 14, 16 after the flow meter 10 were mounted to the plate 12, and the mounting nuts 32, 34 would be tightened down. Valves (not shown) in the fluid system could be opened to permit flow of the fluid into the meter 10 at a constant pressure. Metering could then be accomplished by manipulating the knurled knob 42 to effect withdrawal of the valve member 40 within the passage 38 to an initial point where at least a portion of the orifice 64 became uncovered.

FIG. 1 illustrates a valve member 40 having a planar face 84 most proximate the mounting plate 12. Consequently, the forward edge of the valve member 40 functions, with respect to the circular orifice 64, as a chord. The unoccluded portion of the orifice 64 will, therefore, take a shape, initially, similar to a crescent moon. As the valve member 40 is retracted to reveal more of the orifice 64, the chord defined by the forward edge of the valve member 40 will move across the orifice 64 exposing more and more thereof.

As will be able to be seen in view of this disclosure, the flow initially permitted through the meter 10 will be relatively small. For example, if the dimension of the orifice 64 exposed initially is 0.005 inches, a certain flow will be induced. If the valve member 40 is withdrawn an additional 0.005 inches, an additional volume of flow will be induced, but that volume will exceed the initial volumetric amount by more than a factor of 2. This is so since the dimension of the additional portion of the orifice 64 uncovered, in a direction transverse to the direction of movement of the valve member 40, is significantly greater than that of the portion first exposed. Consequently, more discrimination can be practiced in regulating and adjusting the flow. That is, smaller adjustments can be made to effect a desired change in flow.

As previously indicated, the bore 68 within the sight tube 22 flares radially outwardly as the float 72 moves upward within the bore 68. Consequently, the cross-sectional area of the annular space 86 surrounding the float 72 through which flow occurs becomes greater as the float 72 rises within the tube 22. As more flow is induced by retracting the valve member 40 farther within the passage 38, the increased flow will cause the float 72 to rise so that the flow through the bore 68 will seek to approach the flow that would actually be induced as a result of exposing more of the orifice 64.

As will be able to be seen, then, the position that the float 72 attains in response to retraction of the valve member 40 by manipulation of the control knob 42 correlates with the actual amount of volmetric flow through the meter 10. A particular flow meter can be calibrated so that, for any given slope of the wall defining the bore 68 of the sight tube 22, actual flow can be tabulated for any position of the float 72 within the tube 22. Graduations 88 can be marked, by scoring the sight tube 22, to indicate a particular flow level. The embodiment illustrated in FIG. 1 shows graduations 88 which are equally spaced along the tube 22. A paper backing (not shown) can be applied to a circumferential portion of the sight tube 22 to highlight the location of the float 72 relative to the graduations 88.

Another factor which bears upon the position that the float 72 will attain in response to retraction of the valve member 40 is the weight of the float 72. The float weight can be varied, therefore. If it is made heavier, greater flow can be ascertained without exceeding the limits of the meter 10. Again, a meter 10 having a particular angle of slope of the inner wall defining the bore 68 in the sight tube 22, in combination with a particular float 72, can be calibrated so that the amount of flow represented by the float 72 attaining any particular position is known.

FIG. 4 illustrates a series of curves 90, 92, 94 for various combinations of sight tube diameter slope and float. The left-most curve 90 illustrates a flow meter 10 configured wherein more sensitivity is attained. The flow will vary only between 50 cc of water per min. to 400 cc of water per min. as the float 72 rises from graduation 1 to graduation 10. As one will be able to see, therefore, relatively large manual adjustments can be made, and only small flow changes will result.

The middle and right-most curves 92, 94 indicate flow meters having more coarse sensitivities. For example, the center curve 92 represents a flow meter wherein flow rate adjustment which causes the float 72 to rise from graduation 1 to graduation 10 would result in an actual increase in flow from 200 cc of water per min. to approximately 1800 cc of water per min. Finer adjustments in position of the valve member 40 will, therefore, result in relatively larger changes in total flow, compared to similar manual changes of the meter represented by the first curve 90.

When a flow meter 10 in accordance with the present invention is to be utilized, the purchaser of a unit would have some sense of the ranges within which metering would want to be performed. If relatively low volumes are to be metered, a flow meter whose characteristics are represented by the left-most curve 90 would probably be the optimum choice. The use of that meter would obtain greater discrimination capability. If flow is to be metered over greater ranges, however, the meters whose characteristics are illustrated by the center and right-most curves would probably be necessary.

It will be understood that variations of the structure defined here-in-before are encompassed within the scope of the invention. For example, the shape and size of the orifice 64 could be changed, and characteristics could be adjusted, thereby, accordingly. While a circular orifice 64 is illustrated in FIG. 1, the orifice 64 might be made eliptical, the actual elongation of the elipse either aligned with the axis along which the valve member 40 moves or perpendicular thereto, depending upon characteristics desired to be obtained.

Another variation which the present invention envisions is one wherein the bore formed in the sight tube 22 is not sloped but, rather, has a stepped diameter. At the lower end of the tube 22, the diameter would be uniformly narrow, as at 96, while the diameter would expand into a uniformly enlarged segment immediately above, as at 98. The diameter segments would be coaxial with respect to one another. An axially upwardly facing shoulder 100 would, thereby, be defined.

In this embodiment, the float 102 would be provided with a conically tapering wall 104, the wall tapering inwardly as it extends downwardly. The greatest diameter of the float 102 would be at its upper end so that, when flow is not induced through the meter 10, the upper edge 99 of float 102 would be proximate shoulder 100. As flow would be induced, however, through the meter 10, the float 102 would rise within the bore of the sight tube 22. Because of the tapering of the float 102, the annular space 106 between the float 102 and the edge of the shoulder 100 defined within the sight tube 22 by the differing diameters of the bore would increase as the float 102 rises.

The size and spatial relationship of the float 102 relative to the bore would be such that, as the float 102 would approach an end of the bore proximate the orifice 64, an increasingly greater volume of fluid flow would be permitted through the bore around the float 102. This embodiment would be particularly desirable when low flow rates are desired to be regulated.

Another variation which is contemplated would be one wherein the site tube is downstream of the metering tube. It will be understood that, with regard to this aspect of the invention, positioning of the site tube upstream of the metering tube is not essential.

Because the flow meter 10 is particularly adapted for use with caustic and corrosive chemicals the various components can be made of plastic materials to make them impervious to chemical action that might result because of contact with the chemicals. For example, it is envisioned that, in the preferred embodiment, the metering tube 18, the elbow fitting 20, and the float 72, at least in part, be made of TEFLON ® polytetra-fluoro-ethylene. The rod 76 along which the float 72 rides could be made of chlorinated tetrafluoroethylene.

The sight tube 22 itself could be made of PFA TEFLON ®polytetrafluoro-ethylene. External components could be made of polyvinylchloride. In embodiments wherein it is desired that the float 72 be heavier, a TEFLON ® float 72 could be embedded with stainlesss steel or be replaced by a completely stainless steel float. Consequently the whole flow meter assembly could be made insoluble and impervious to chemical action with a liquid.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. A fluid flow meter, comprising:
   (a) a metering tube having a passage formed axially therethrough, and a generally circular orifice intersection said passage along the length thereof, a portion of said passage on one side of said orifice defining a flow duct, and a portion of said passage on a second side of said orifice defining a valve-receiving duct;
   (b) a sight tube having a bore formed axially therethrough, said bore being in fluid communication with said metering tube passage flow duct through said orifice when said orifice is unobstructed, said sight tube further including a flow sensitive element disposed for axial movement through said bore and biased away from said metering tube, the size and spatial relationship of said flow sensitive element being such, relative to said bore, so that, as said element approaches an end of said bore proximate said orifice, an increasingly greater volume of fluid flow is permitted through said bore around said element,
   (c) a valve member, having a generally planar forward end, substantially orthogonal to an axis of said passage, disposed in said passage for selective positioning axially therealong, and retraction across said orifice in a direction away from said flow duct to regulate fluid flow through said bore; wherein, as said valve member is positioned to permit increased fluid flow through said bore, said flow sensitive element is urged by the fluid flow toward said end of said bore proximate said orifice; and
   (d) means for ascertaining volumetric flow of fluid through the flow meter depending upon the axial position of the flow sensitive element attached within said bore.

2. A flow meter in accordance with claim 1 wherein a diametrical dimension of said bore tapers radially outwardly as said bore approaches said orifice, a flow determinant diametrical dimension of said flow sensitive element remaining constant.

3. A flow meter in accordance with claim 1 wherein an axis with respect to which said passage is formed is oriented generally horizontally, and wherein an axis with respect to which said bore is formed is oriented generally vertically.

4. A flow meter in accordance with claim 3 wherein said flow sensitive element is gravity-biased away from said metering tube.

5. A flow meter in accordance with claim 4 further comprising means for maintaining said flow sensitive element coaxial with respect to said bore.

6. A flow meter in accordance with claim 5 wherein an aperture is formed centrally within said flow sensitive element, and wherein said coaxial maintaining means comprises a rod, aligned along the axis of said bore, passing through said aperture formed centrally within said flow sensitive element.

7. A flow meter in accordance with claim 1 wherein said ascertaining means comprises a series of graduated indicia along said sight tube, each indicium being representative of a particular fluid flow value.

8. A flow meter in accordance with claim 7 wherein said sight tube is transparent and said flow sensitive element viewable relative to said graduated indicia.

9. A flow meter in accordance with claim 1 wherein said metering tube, said sight tube, said flow sensitive element, and said valve member are formed of a material insoluble to corrosive acids and solvents and deionized water.

10. A flow meter in accordance with claim 9 wherein said metering tube, said sight tube, and said valve member are formed of plastic materials.

11. A flow meter in accordance with claim 9 wherein said flow sensitive element is formed from polytetrafluoro-ethylene.

12. A flow meter in accordance with claim 9 wherein said flow sensitive element is formed from stainless steel.

13. A flow meter in accordance with claim 9 wherein said flow sensitive element is formed from a combination of polytetrafluoro-ethylene and stainless steel.

* * * * *